(12) United States Patent
Katoh et al.

(10) Patent No.: US 7,558,007 B2
(45) Date of Patent: Jul. 7, 2009

(54) RADAR APPARATUS AND OPTICAL RECEIVER THEREOF

(75) Inventors: Hisaya Katoh, Takahama (JP); Noriyuki Matsushita, Nagoya (JP)

(73) Assignee: DENSO CORPORATION, Kariya (JP)

( * ) Notice: Subject to any disclaimer, the term of this patent is extended or adjusted under 35 U.S.C. 154(b) by 30 days.

(21) Appl. No.: 11/808,590

(22) Filed: Jun. 12, 2007

(65) Prior Publication Data
US 2008/0130138 A1 Jun. 5, 2008

(30) Foreign Application Priority Data
Jun. 27, 2006 (JP) ............... 2006-177106

(51) Int. Cl.
*G02B 17/00* (2006.01)
(52) U.S. Cl. ..................... 359/728
(58) Field of Classification Search ........ 359/726, 359/728, 737; 250/559.38
See application file for complete search history.

(56) References Cited

U.S. PATENT DOCUMENTS 5,486,953 A * 1/1996 Shu .................. 359/726

FOREIGN PATENT DOCUMENTS

| JP | A-2001-12943 | 1/2001 |
| JP | A-2002-236178 | 8/2002 |

* cited by examiner

*Primary Examiner*—Alicia M Harrington
(74) *Attorney, Agent, or Firm*—Posz Law Group, PLC

(57) ABSTRACT

A radar apparatus has a light receiver that includes a refractive body and a mirror on an opposite surface of the refractive body relative to an incidence surface of the refractive body for receiving an incident light from an outside of the radar apparatus. The refractive angle of the refractive body is configured to be smaller than an incident angle of the incident light, and the mirror is configured to reflect at least a portion of the incident light toward a first light receiving element that is disposed on the incidence surface with its light receiving face facing the incidence surface of the refractive body.

22 Claims, 6 Drawing Sheets

RADAR APPARATUS AND OPTICAL RECEIVER THEREOF

CROSS REFERENCE TO RELATED APPLICATION

This application is based on and claims the benefit of priority of Japanese Patent Application No. 2006-177106 filed on Jun. 27, 2006, the disclosure of which is incorporated herein by reference.

FIELD OF THE INVENTION

The present invention generally relates to a radar for use in a vehicle.

BACKGROUND INFORMATION

As radar devices, conventionally, there have been known those disclosed in Patent Documents 1 and 2, for example.

A radar device disclosed in Patent Document 2 is so constructed that the following is implemented: light receiving unit (photodiode) is placed in an enclosure that constructs an illuminating lamp (headlight); reflected light reflected by a reflective object is reflected by a reflector that constructs the headlight; and it is further reflected by a second reflector and received by the receiving unit. More specifically, the reflected light reflected by the reflective object is received by the receiving unit through a reflector as a concave mirror.

[Patent Document 1] JP-A-2001-12943

[Patent Document 2] JP-A-2002-236178

Attempts have been made to detect light in a wide angular range with the aim of expanding a range of detection or lengthening a detection distance. To do this with the construction disclosed in Patent Document 1, it is required to increase the diameter of a condenser lens if its shape is unchanged. With respect to condenser lenses, lens aberration need be taken into account as well. To ensure a desired lens effective diameter, it is required to further increase the diameter of the condenser lens. This results in an increased physical size of a light receiving optical system (radar apparatus).

In the construction disclosed in Patent Document 2, meanwhile, a reflector as a concave mirror is used in place of a condenser lens. Therefore, a problem of aberration does not arise, and the physical size of the light receiving optical system can be accordingly reduced. However, the construction disclosed in Patent Document 2 involves another problem. To detect light in a wide angular range, it is required to increase the size of the mirror if its shape is unchanged. This increases the physical size of the light receiving optical system (radar apparatus). In the construction disclosed in Patent Document 2, light receiving unit is disposed in proximity to a light source in the enclosure that constructs an illuminating lamp. Therefore, there is the possibility that the temperature of a light-sensitive element is raised, and the characteristics of the element are degraded (the reliability of the light-sensitive element is degraded).

SUMMARY OF THE INVENTION

In view of the above and other problems, the present invention provides an optical receiver that is capable of detecting light in a wide angular range without increase in physical size and makes it possible to enhance the reliability of a light-sensitive element, and a radar device equipped with this optical receiver.

A light receiver of the present disclosure includes a refractive body that receives an incident light coming in at an incident angle and refracts the incident light with a refractile angle, a first light receiving element that is disposed in a position on an incidence surface of the refractive body, and a mirror that is disposed on an opposite plane being on an opposite side of the refractive body relative to the incidence surface.

In the light receiver, the refractile angle is smaller than the incident angle, and a light receiving face of the first light receiving element faces on the incidence surface of the refractive body. Further, the mirror reflects at least a portion of the incident light coming into the refractive body through the incidence surface toward the first light receiving element.

In this manner, an external light, e.g., a light reflected by a reflective object, is refracted by a refractive body having a greater refractive index than an external environment, e.g., air, with a refractile angle that is smaller than an incident angle. That is, the external light having an angle relative to an optical axis of the mirror has a smaller angle relative to the optical axis after refraction by the refractive body to be closely aligned with the optical axis. Therefore, a light receiving angle of the light receiving element after reflection by the mirror is widened (i.e., an incident angle range on an incidence angle of the refractive body is increased). Further, use of the mirror prevents the problem of the aberration of the condenser lens, thereby enabling detection of a wider angle range without increasing a volume of receiver body. Furthermore, an area of the light receiving element in the optical receiver can be made smaller than the one that does not have the refractive body when the external light is collected from the same range of the angle.

In addition, the optical receiver is not integrally composed with a light emission unit, thereby having an increased reliability.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the accompanying the drawings.

First Embodiment

Figure 1:
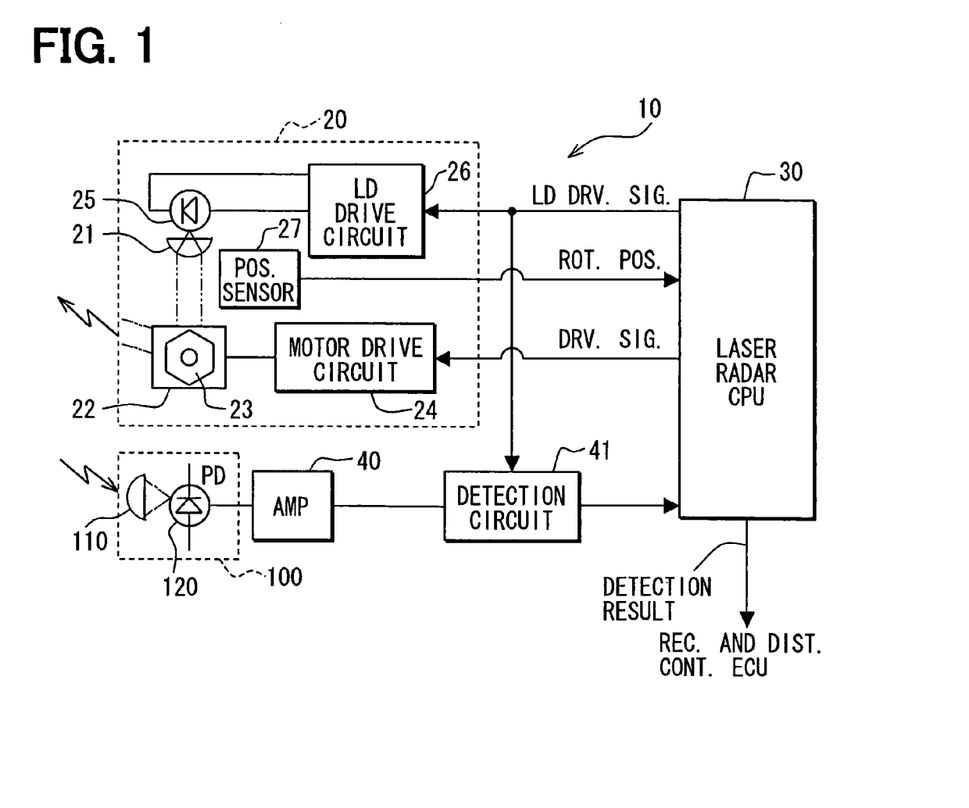
FIG. 1 is a drawing illustrating the configuration of a laser radar sensor.

First, description will be given to the general configuration of a laser radar sensor to which an optical receiver in a first embodiment is applied. FIG. 1 is a general block diagram illustrating an example of the laser radar sensor. The invention is characterized in the configuration of the optical receiver. The radar device (not shown) including the laser radar sensor is described, for example, in JP-A-2005-257405, filed by the present applicants, and the like. Therefore, the detailed description of the radar device is omitted. The following description takes as an example a case where the radar device is used as a radar device for vehicles. However, the radar device according to the invention is not limited to those for vehicles, and can be used to detect any intruder into a specific area.

As illustrated in FIG. 1, the laser radar sensor 10 is constructed of the following as principal parts: a light sender 20 that projects laser light; an optical, receiver 100 that receives reflected light reflected by a reflective object; a laser radar CPU 30; and the like.

The light sender 20 includes a laser diode 25 for projecting pulsed laser light through a lens 21 and a scanner 22. The laser diode 25 is connected with the laser radar CPU 30 through a laser diode drive circuit 26, and projects (emits) laser light according to a driving signal from the laser radar CPU 30. The scanner 22 is provided with a polygonal mirror 23 so that it is rotatable on a vertical axis. When a driving signal from the laser radar CPU 30 is inputted to a motor drive circuit 24, the polygonal mirror 23 is rotated by driving force from a motor, not shown. The rotational position of the motor is detected by a motor rotational position sensor 27, and is outputted to the laser radar CPU 30. The polygonal mirror 23 in this embodiment includes six mirrors different in planar inclination angle. Therefore, laser light can be outputted so that the laser light discontinuously scans a predetermined angular range both in the direction of vehicle width and in the direction of vehicle height. However, consideration need not be given to the scan method, and any method can be adopted as long as it makes it possible to make measurement in two directions, in addition to the measurement of distance.

The optical receiver 100 includes: a light condensing member 110 that condenses laser light reflected by a reflective object (e.g., a reflector on the vehicle ahead), not shown; and a light-sensitive element (photodiode) 120 that outputs a voltage signal (light reception signal) corresponding to the intensity of the condensed reflected light. The configuration of the optical receiver 100 will be described later. A light reception signal outputted by the light-sensitive element 120 is amplified at an amplifier 40 and then inputted to a detection circuit 41. The signal is subjected to predetermined processing at the detection circuit 41, and then outputted to the laser radar CPU 30. The distance to the reflective object is detected based on the time from when the laser light is projected to when the reflected light is received. The direction of the reflective object is detected based on the projection angle of the laser light. This result of detection is outputted to a recognition and following distance control ECU, and the vehicle is controlled based on the result of detection.

Figure 2A:
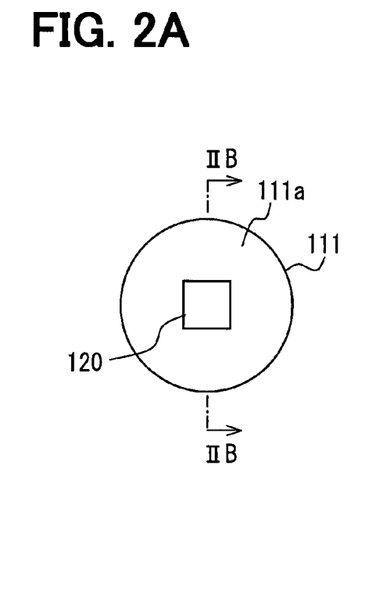
FIGS. 2A and 2B are drawings illustrating the general configuration of an optical receiver in a first embodiment, FIG. 2A being a plan view as viewed from an incidence surface side and FIG. 2B being a sectional view taken along a line IIB-IIB in FIG. 2A.
Figure 2B:
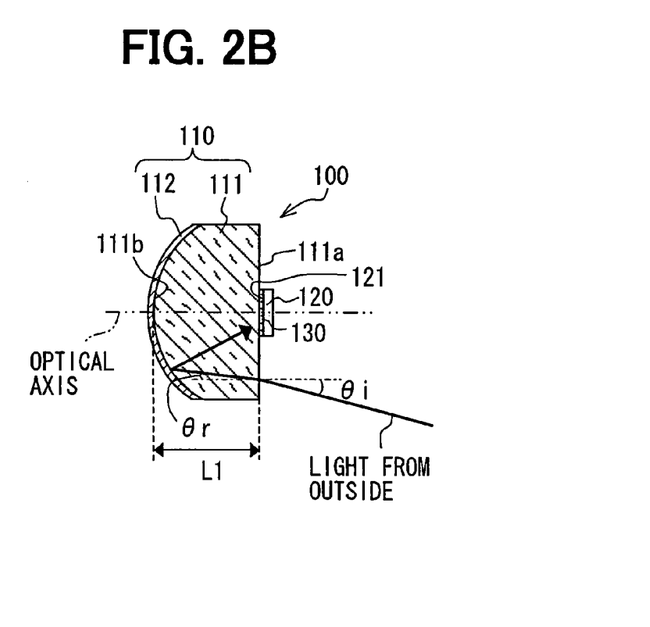

Description will be given to the optical receiver 100 with reference to FIGS. 2A and 2B. FIGS. 2A and 2B are drawings illustrating the general configuration of the optical receiver 100. FIG. 2A is a plan view as viewed from the incidence surface side, and FIG. 2B is a sectional view taken along a line IIB-IIB in FIG. 2A.

As mentioned above, the optical receiver 100 includes the light condensing member 110 and the light-sensitive element 120. The light condensing member 110 is constructed of a refractive body 111 and a mirror 112. As illustrated in FIG. 2B, the refractive body 111 refracts light from outside (a source external to the vehicle in this embodiment) so that the refraction angle θr is smaller than the incident angle θi. (In this embodiment, the above light is reflected light obtained by a reflective object reflecting laser light projected from the light sender 20.) For the constituent material of the refractive body 111, any publicly known material whose refractive index is higher than that of an ambient atmosphere can be appropriately selected and adopted. (The ambient atmosphere is air in this embodiment.) (Such a material is a material whose absolute refractive index is greater than 1, in other words.) When a material is selected, consideration is given to the shape (ease of forming) of the refractive body 111, the wavelength of incident light, a refractive index requirement, and the like. For example, glass, synthetic resin, a semiconductor material such as silicon or germanium, or the like can be adopted. This embodiment adopts glass as the refractive body.

As illustrated in FIGS. 2A and 2B, the refractive body 111 in this embodiment includes a columnar portion. An end face of the columnar portion (a plane perpendicular to the optical axis of the mirror 112) is taken as an incidence surface 111a on which external light is incident. An opposite face 111b opposed to the incidence surface 111a is constructed as a curved surface convex on the opposite side to the incidence surface 111a, more specifically, constructed as a spherical surface. The refractive body 111 in such a shape can be formed by grinding a columnar member or molding (press, extrusion). The columnar portion is suitable for gripping the refractive body 111; however, it is dispensable in terms of the functions of the optical receiver 100.

The mirror 112 is provided on the surface of the opposite face 111b of the refractive body 111. It reflects at least part of light, incident on the refractive body 111 through the incidence surface 111a, toward the light-sensitive element 120. For the constituent material of this mirror 112, any material can be adopted as long as it can reflect external light. For example, the mirror can be constructed by depositing Al, Ag, or Au on the surface of the opposite face 111b by evaporation coating or the like. It may be constructed as a multilayer film.

As illustrated in FIG. 2B, the mirror 112 in this embodiment is provided on the opposite face 111b of the refractive body 111 spherically formed so that it is convex on the opposite side to the incidence surface 111a. That is, the mirror is constructed as a concave mirror 112 along the opposite face 111b. With the mirror constructed as the concave mirror 112, as mentioned above, light can be efficiently condensed onto the light-sensitive element 120. In this embodiment, the mirror 112 is a spherical mirror. Spherical mirrors have no focal point. In a spherical mirror, the position of the point of intersection of the optical axis of the mirror 112 and reflected light from the mirror 112 does not vary so much as compared with mirrors in any other shape (paraboloid and ellipsoid). This holds regardless of the incident angle θi. (The optical axis of the mirror is indicated by an alternate long and two short dashes line in FIG. 2B.) Therefore, spherical mirrors are suitable for detecting light in a wide angular range (a wind range of incident angle θi).

The light-sensitive element 120 is a photodiode formed in a semiconductor substrate. It is disposed on the incidence surface 111a of the refractive body 111 with its light receiving surface 121 facing toward the incidence surface 111a. There is not any special limitation on its disposed position as long as it is located on the incidence surface 111a. The light-sensitive element 120 may be so constructed that it is not fixed on the incidence surface 111a and is disposed in suspension above the incidence surface 111a. However, it is desirable that it should be fixed on the incidence surface 111a of the refractive body 111 in direct contact with the incidence surface 111a or with a fixing member in-between. The position of the light-sensitive element 120 can be easily determined relative to the incidence surface 111a.

In this embodiment, as illustrated in FIG. 2B, the following measure is taken: the light-sensitive element 120 having the rectangular light receiving surface 121 is fixed in the position overlapping the optical axis on the incidence surface 111a through adhesive 130. For the adhesive 130, that composed of a material (e.g., silicon adhesive) having the same refractive index as that of the refractive body 111 is adopted. As mentioned above, the light-sensitive element 120 is brought into indirect contact with the incidence surface 111a though the fixing member. With this construction, the following can be implemented by adopting a fixing member having the same refractive index as that of the refractive body 111: reflection can be reduced as much as possible between the refractive body 111 and the fixing member (the adhesive 130 in this embodiment) before the incident light arrives at the light receiving surface 121.

Figure 3:
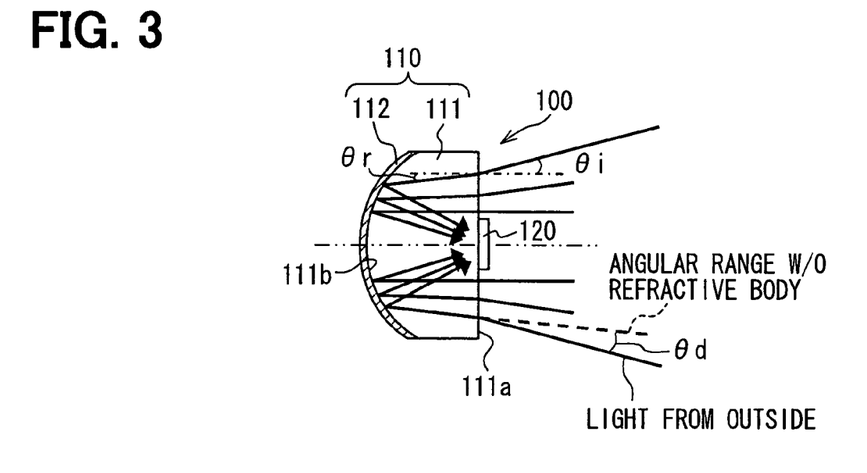
FIG. 3 is a drawing illustrating an effect of a refractive body.

Description will be given to the action and effect of the above-mentioned optical receiver 100 with reference to FIG. 3. FIG. 3 is a drawing illustrating the effect of the refractive body 111. As illustrated in FIG. 3, external light is refracted by the refractive body 111 composed of a material whose refractive index is higher than that of an external medium (e.g., air) at an angle θr smaller than the incident angle θi. That is, the light at an angle to the optical axis of the mirror 112 is refracted by the refractive body 111, and it is thereby made closer to parallel to the optical axis than before it is refracted. As illustrated in FIG. 3, especially, light having a larger incident angle θi is more intensely influenced by the refracting action of the refractive body 111 (Snell's law of refraction). Part of external light is reflected by the incidence surface 111a of the refractive body 111, and a condensing loss occurs. The larger the incident angle θi is, the more the effect of refracting action surpasses the reflection loss and the light condensing efficiency is enhanced. Therefore, the angular range within which light is reflected by the mirror 112 and condensed onto the light-sensitive element 120 can be expanded as compared with constructions without the refractive body 111. (The angular range is a range of the angle θi of incidence on the incidence surface 111a of the refractive body 111.) The angular range is expanded by an amount equivalent to the angular difference θd, as illustrated in FIG. 3. Since light is condensed by the mirror 112, a problem of lens aberration does not arise unlike condenser lenses. Though not shown in the drawing, further, the following advantage is brought. Light that was not let into the light-sensitive element 120 at the first time of reflection by the mirror 112 is repeatedly reflected between the refractive body 111 and the external medium (air) or between the refractive body 111 and the mirror 112. Then, even this light is let into the light-sensitive element 120.

In the optical receiver 100 according to this embodiment, as mentioned above, light in a wide angular range can be detected without increasing its physical size. Since the light condensing efficiency is high, the following advantage is brought: the area of the light-sensitive element 120 (light receiving surface 121) can be reduced if the angular range is identical, as compared with constructions without the refractive body 111. Since the optical receiver 100 is not placed in a high-temperature environment (it is not constructed integrally with an illuminating lamp), unlike conventional cases, the reliability of the light-sensitive element 120 can be enhanced. Therefore, this construction is suitable for a radar device including the laser radar sensor 10.

Figure 4:
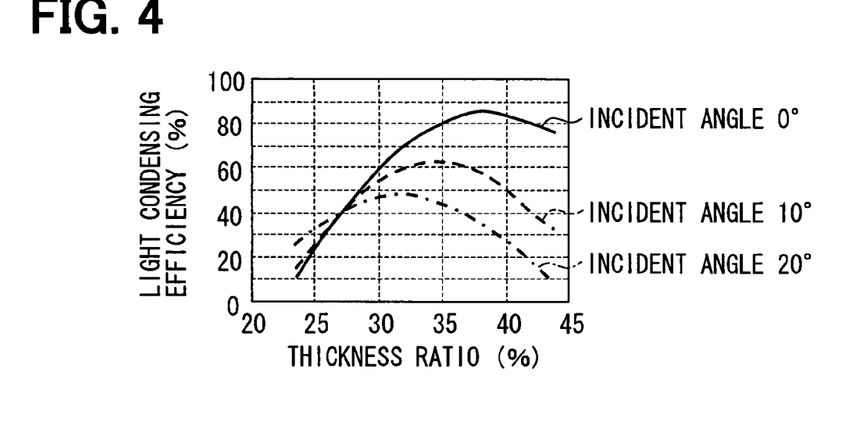
FIG. 4 is a drawing illustrating the relation between the thickness ratio of a refractive body and light condensing efficiency.

The present inventors verified the relation between the following with respect to the radius of curvature of the mirror 112: the ratio of the opposition distance L1 between the incidence surface 111a and opposite face 111b of the refractive body 111 along the optical axis (the ratio of thickness of the refractive body 111) (Refer to FIG. 2B); and the light condensing efficiency of the optical receiver 100. FIG. 4 illustrates the result of the verification. FIG. 4 is a drawing illustrating the relation between the thickness ratio of the refractive body 111 against a radius of curvature of mirror surface and the light condensing efficiency. When the verification was conducted, the following conditions were used: the radius of curvature of the mirror 112 should be 8 mm; the diameter of the circular incidence surface 111a of the refractive body 111 should be 10 mm; and the size of the light-sensitive element 120 in the direction of the light receiving surface should be 3 mm square. When light is transmitted with its beam diameter reduced (in a state close to parallel light), like light from a laser pointer, a loss of 50% or so occurs from when the light is transmitted to when it is reflected by a reflective object and received. To ensure a light condensing efficiency of 10% in total, ranging from transmission to reception, the following measure was taken with the foregoing taken into account: it was ensured that the light-sensitive element 120 could detect with accuracy a range within which a light condensing efficiency of 20% or higher could be ensured at the optical receiver 100. It was revealed that light in a wide angular range could be efficiently condensed (detected by the light-sensitive element 120 with accuracy) by taking the following measure (the angular range is the range of angle θi of incidence on the incidence surface 111a of the refractive body 111): the optical receiver 100 is so constructed that the ratio of thickness of the refractive body 111 is not less than 0.25 and not more than 0.40, as illustrated in FIG. 4. In FIG. 4, the maximum value of light condensing efficiency is not 100% when the incident angle θi is 0°. This is because light is blocked by the light-sensitive element 120 and is reflected at the incidence surface 111a of the refractive body 111.

The above description of this embodiment takes as an example a case where the following measure is taken: the incidence surface 111a of the refractive body 111 is in a circular shape, and the light receiving surface 121 of the light-sensitive element 120 placed on the incidence surface 111a is in a rectangular shape. However, the shape of each member is not limited to that in the example.

The above description of this embodiment takes an example a case where the light-sensitive element 120 is fixed in a position overlapping the optical axis on the incidence surface 111a. However, the disposed position of the light-sensitive element 120 is not limited to that in the example. The light-sensitive element 120 may be fixed in a position off the optical axis on the incidence surface 111a depending on the use environment.

Figure 5A:
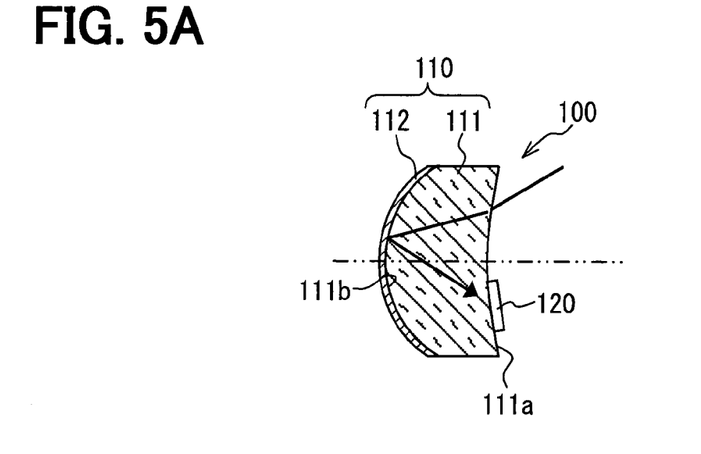
FIGS. 5A to 5C are sectional views illustrating modifications to an optical receiver.
Figure 5B:
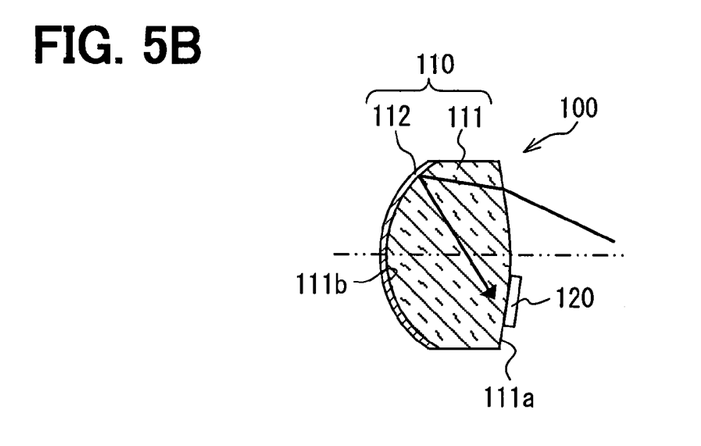
Figure 5C:
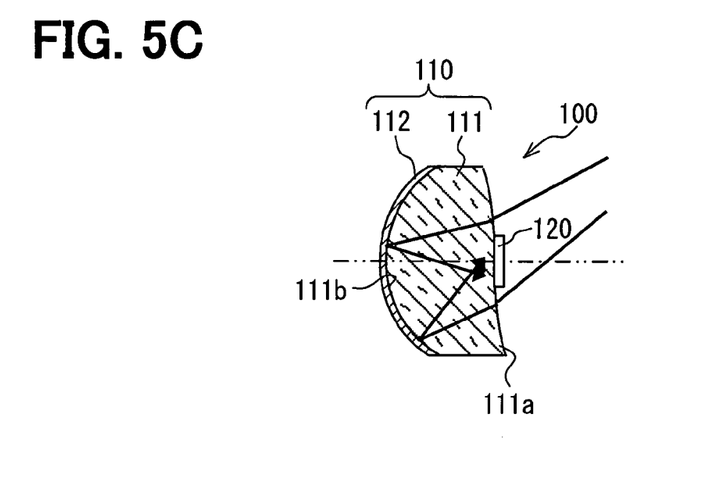

The above description of this embodiment takes as an example a case where the incidence surface 111a of the refractive body 111 is a flat surface perpendicular to the optical axis. However, the shape of the incidence surface 111a is not limited to that in the example. For example, it may be constructed as a concave incidence surface 111a as illustrated in FIG. 5A, or may be constructed as a convex incidence surface 111a as illustrated in FIG. 5B. Further, it may be constructed as an incidence surface 111a including a concave portion and a convex portion as illustrated in FIG. 5C. When the incidence surface 111a is constructed as a curved surface, light in an angular range different from that when the incidence surface 111a is a flat surface perpendicular to the optical axis of the mirror 112 can be efficiently condensed. Especially, when the incidence surface is so constructed that concave and convex switch with each other with the optical axis at the center, as illustrated in FIG. 5C, the following advantage is brought: when the angular range is not symmetrical with respect to the optical axis and is asymmetric, it is possible to enhance the light condensing efficiency and detect light in a wide angular range. FIGS. 5A to 5C are sectional views illustrating modifications to the optical receiver 100. The optical receiver illustrated in FIG. 5A includes a concave incidence surface 111a; that illustrated in FIG. 5B includes a convex incidence surface 111a; and that illustrated in FIG. 5C includes an incidence surface 111a having a concave portion and a convex portion. FIGS. 5A to 5C correspond to FIG. 2B. To enhance the light condensing efficiency, the light-sensitive element 120 is positioned off the optical axis in FIGS. 5A and 5B.

Figure 6:
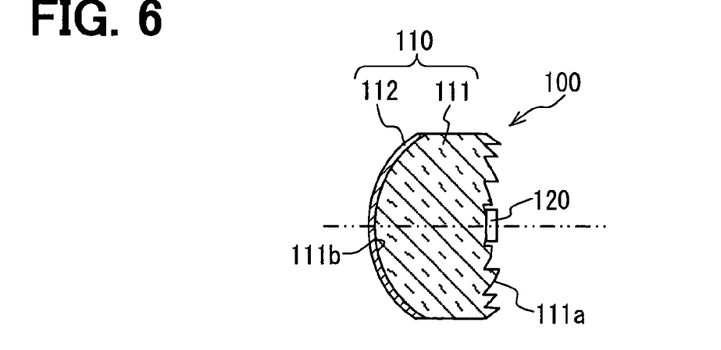
FIG. 6 is a sectional view illustrating a modification to an optical receiver.

Further, the incidence surface 111a of the refractive body 111 may be constructed as a Fresnel surface as illustrated in FIG. 6. With this construction, the same effect as with the above-mentioned curved surface can be obtained, and further the physical size of the optical receiver 100 can be reduced (in the direction along the optical axis). FIG. 6 is a sectional view illustrating a modification to the optical receiver 100, and the Fresnel surface corresponds to the convex incidence surface 111a illustrated in FIG. 5B.

Second Embodiment

Figure 7:
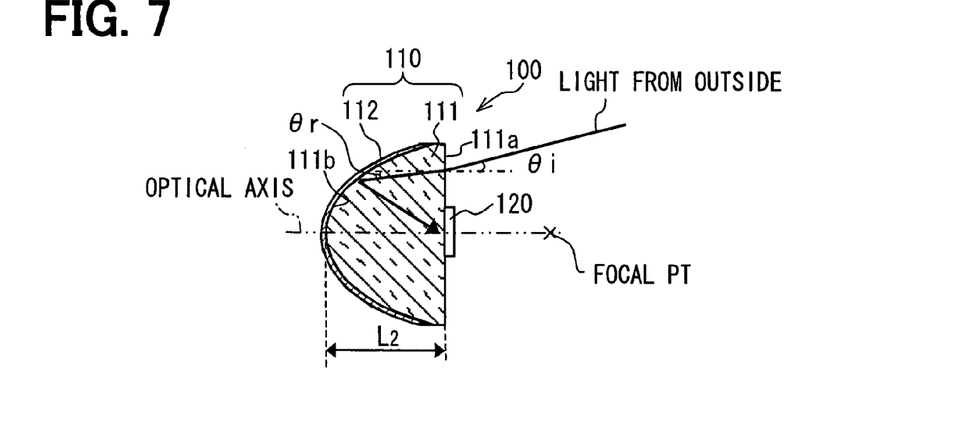
FIG. 7 is a sectional view illustrating the general configuration of an optical receiver in a second embodiment.

Description will be given to a second embodiment of the invention with reference to FIG. 7. FIG. 7 is a sectional view illustrating the general configuration of an optical receiver 100 in a second embodiment of the invention, and it corresponds to FIG. 2B referred to in relation to the first embodiment. In FIG. 7, the adhesive 130 is omitted.

As illustrated in FIG. 7, this embodiment is characterized in that the opposite face 111b of the refractive body 111 is constructed as a paraboloid and the concave mirror 112 is constructed as a parabolic mirror 112. More specific description will be given. The light-sensitive element 120 having the rectangular light receiving surface 121 is fixed in a position overlapping the optical axis on the incidence surface 111a between the parabolic mirror 112 and its focal point.

When this construction is adopted, the same phenomenon as with the spherical surface mirror described in relation to the first embodiment takes place. As illustrated in FIG. 7, external light is refracted by the refractive body 111 composed of a material whose refractive index is higher than that of an external medium (e.g., air) at an angle θr smaller than the incident angle θi. That is, the light at an angle to the optical axis of the mirror 112 is refracted by the refractive body 111, and it is thereby made closer to parallel to the optical axis than before it is refracted. This reduces variation in the position of the point of intersection of the reflected light from the mirror 112 and the optical axis. (The position of the point of intersection is brought into proximity to the focal point.) Part of external light is reflected by the incidence surface 111a of the refractive body 111, and a condensing loss occurs. The larger the incident angle θi is, the more the effect of refracting action surpasses the reflection loss and the light condensing efficiency is enhanced. Therefore, the angular range within which light is reflected by the mirror 112 and condensed onto the light-sensitive element 120 can be expanded as compared with constructions without the refractive body 111. (The angular range is the range of angle θi of incidence on the incidence surface 111a of the refractive body 111.) Since light is condensed by the mirror 112, a problem of lens aberration does not arise unlike condenser lenses. Though not shown in the drawing, further, the following advantage is brought. Light that was not let into the light-sensitive element 120 at the first time of reflection by the mirror 112 is repeatedly reflected between the refractive body 111 and the external medium (air) or between the refractive body 111 and the mirror 112. Then, even this light is let into the light-sensitive element 120.

As mentioned above, the following advantage is brought with the optical receiver 100 in this embodiment. A parabolic mirror 112 can condense light parallel to the optical axis of the mirror 112 onto its focal point in a construction without the refractive body 111. However, this increases variation in the position of the point of intersection of the reflected light of light out of parallelism reflected by the mirror 112 and its optical axis. Even though this parabolic mirror is adopted, the optical receiver in this embodiment can detect light in a wide angular range without increase in physical size as the optical receiver 100 in the first embodiment can. Since the light condensing efficiency is high, the following advantage is brought: the area of the light-sensitive element 120 (light receiving surface 121) can be reduced if the angular range is identical, as compared with constructions without the refractive body 111. Further, since the optical receiver 100 is not placed in a high-temperature environment (it is not constructed integrally with an illuminating lamp), unlike conventional cases, the reliability of the light-sensitive element 120 can be enhanced. Therefore, this construction is suitable for a radar device including the laser radar sensor 10.

Figure 8:
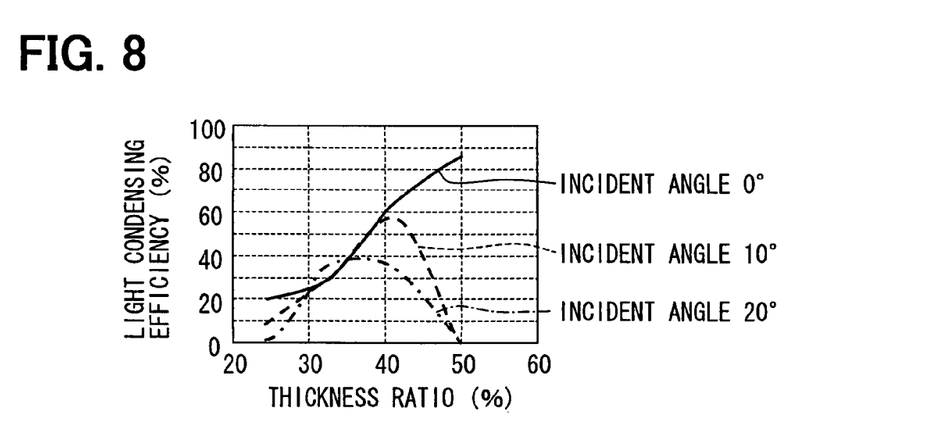
FIG. 8 is a drawing illustrating the relation between the thickness ratio of a refractive body and light condensing efficiency.

The present inventors verified the relation between the following with respect to the radius of curvature at the parabolic peak of the mirror 112: the ratio of the opposition distance L2 between the incidence surface 111a and opposite face 111b of the refractive body 111 along the optical axis (the ratio of thickness of the refractive body 111 against a radius of curvature of a mirror surface); and the light condensing efficiency of the optical receiver 100. FIG. 8 illustrates the result of the verification. FIG. 8 is a drawing illustrating the relation between the thickness ratio of the refractive body 111 against a radius of curvature of mirror surface and the light condensing efficiency. When the verification was conducted, the following conditions were used: the radius of curvature of the mirror 112 should be 6 mm; the diameter of the circular incidence surface 111a of the refractive body 111 should be 10 mm; and the size of the light-sensitive element 120 in the direction of the light receiving surface should be 3 mm square. When light is transmitted with its beam diameter reduced (in a state close to parallel light), like light from a laser pointer, a loss of 50% or so occurs from when the light is transmitted to when it is reflected by a reflective object and received. To ensure a light condensing efficiency of 10% in total, ranging from transmission to reception, the following measure was taken with the foregoing taken into account: it was ensured that the light-sensitive element 120 could detect with accuracy a range within which a light condensing efficiency of 20% or higher could be ensured at the optical receiver 100. It was revealed that light in a wide angular range could be efficiently condensed (detected by the light-sensitive element 120 with accuracy) by taking the following measure (the angular range is the range of angle θi of incidence on the incidence surface 111a of the refractive body 111): the optical receiver 100 is so constructed that the ratio of thickness of the refractive body 111 is not less than 0.30 and not more than 0.45, as illustrated in FIG. 8.

The description of this embodiment has been given to a construction in which light in a wide angular range is detected. However, the effect of this embodiment is not limited to this. The parabolic mirror 112 can condense light parallel to the optical axis of the mirror 112 onto its focal point. More specifically, with respect to light at a small incident angle θi, the position of the point of intersection of the optical axis of the mirror 112 and reflected light from the mirror 112 does not vary so much. This variation can be further reduced by the effect of the refractive body 111. Therefore, light in a narrow angular range can be efficiently detected by placing the light-sensitive element 120 in the position of the focal point of the mirror 112.

The above description of this embodiment takes as an example a case where the following measure is taken: the incidence surface 111a of the refractive body 111 is in a circular shape, and the light receiving surface 121 of the light-sensitive element 120 placed on the incidence surface 111a is in a rectangular shape. However, the shape of each member is not limited to that in the example.

The above description of this embodiment takes as an example a case where the light-sensitive element 120 is fixed in a position overlapping the optical axis on the incidence surface 111a. However, the disposed position of the light-sensitive element 120 is not limited to that in the example. The light-sensitive element 120 may be fixed in a position off the optical axis on the incidence surface 111a depending on the use environment.

The above description of this embodiment takes as an example a case where the incidence surface 111a of the refractive body 111 is a flat surface perpendicular to the optical axis. However, the incidence surface 111a may be constructed as a curved surface as illustrated in FIGS. 5A to 5C referred to in relation to the first embodiment. Further, the incidence surface may be constructed as a Fresnel surface as illustrated in FIG. 6 referred to in relation to the first embodiment.

Third Embodiment

Figure 9:
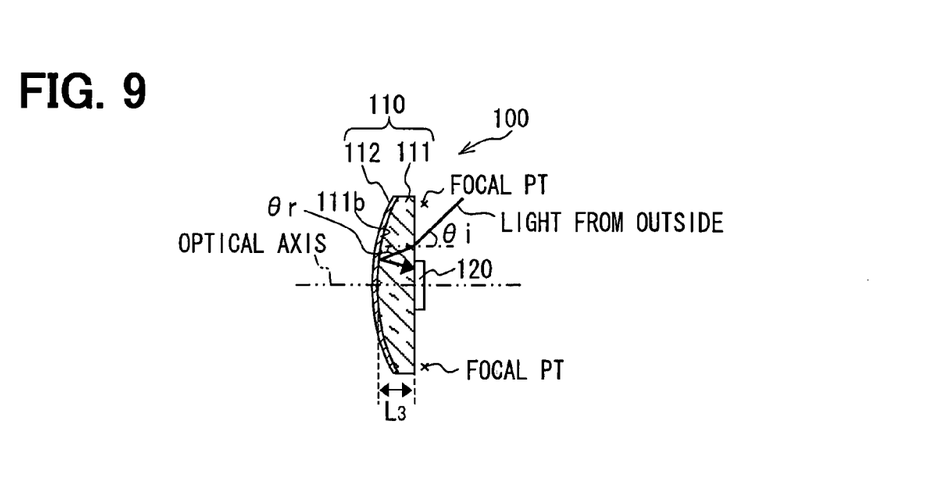
FIG. 9 is a sectional view illustrating the general configuration of an optical receiver in a third embodiment.

Description will be given to a third embodiment of the invention with reference to FIG. 9. FIG. 9 is a sectional view illustrating the general configuration of an optical receiver 100 in the third embodiment of the invention, and it corresponds to FIG. 2B referred to in relation to the first embodiment. In FIG. 9, the adhesive 130 is omitted.

As illustrated in FIG. 9, this embodiment is characterized in that: the opposite face 111b of the refractive body 111 is constructed as an ellipsoid (eccentric ellipsoid in which the mirror surface intersects its minor axis in FIG. 9); and the concave mirror 112 is constructed as an ellipsoidal mirror 112. The light-sensitive element 120 having the rectangular light receiving surface 121 is fixed in a position overlapping the optical axis on the incidence surface 111a.

When this construction is adopted, the same phenomenon as with the spherical surface mirror described in relation to the first embodiment takes place. As illustrated in FIG. 9, external light is refracted by the refractive body 111 composed of a material whose refractive index is higher than that of an external medium (e.g., air) at an angle θr smaller than the incident angle θi. That is, the light at an angle to the optical axis of the mirror 112 is refracted by the refractive body 111, and it is thereby made closer to parallel to the optical axis than before it is refracted. This reduces variation in the position of the point of intersection of the reflected light from the mirror 112 and the optical axis. (The position of the point of intersection is brought into proximity to the focal point.) Part of external light is reflected by the incidence surface 111a of the refractive body 111, and a condensing loss occurs. The larger the incident angle θi is, the more the effect of refracting action surpasses the reflection loss and the light condensing efficiency is enhanced. Therefore, the angular range within which light is reflected by the mirror 112 and condensed onto the light-sensitive element 120 can be expanded as compared with constructions without the refractive body 111. (The angular range is the range of angle θi of incidence on the incidence surface 111a of the refractive body 111.) Since light is condensed by the mirror 112, a problem of lens aberration does not arise unlike condenser lenses. Though not shown in the drawing, further, the following advantage is brought. Light that was not let into the light-sensitive element 120 at the first time of reflection by the mirror 112 is repeatedly reflected between the refractive body 111 and the external medium (air) or between the refractive body 111 and the mirror 112. Then, even this light is let into the light-sensitive element 120.

As mentioned above, the following advantage is brought with the optical receiver 100 in this embodiment. An ellipsoidal mirror 112 can reflect light from either of the two focal points to the other focal point in a construction without the refractive body 111 regardless of the incident angle θi. However, this increases variation in the position of the point of intersection of the reflected light that does not pass through a focal point and is reflected by the mirror 112 and the optical axis. Even though this ellipsoidal mirror is adopted, the optical receiver in this embodiment can detect light in a wide angular range without increase in physical size as the optical receiver 100 in the first embodiment can. Since the light condensing efficiency is high, the following advantage is brought: the area of the light-sensitive element 120 (light receiving surface 121) can be reduced if the angular range is identical, as compared with constructions without the refractive body 111. Further, since the optical receiver 100 is not placed in a high-temperature environment (it is not constructed integrally with an illuminating lamp), unlike conventional cases, the reliability of the light-sensitive element 120 can be enhanced. Therefore, this construction is suitable for a radar device including the laser radar sensor 10.

Figure 10:
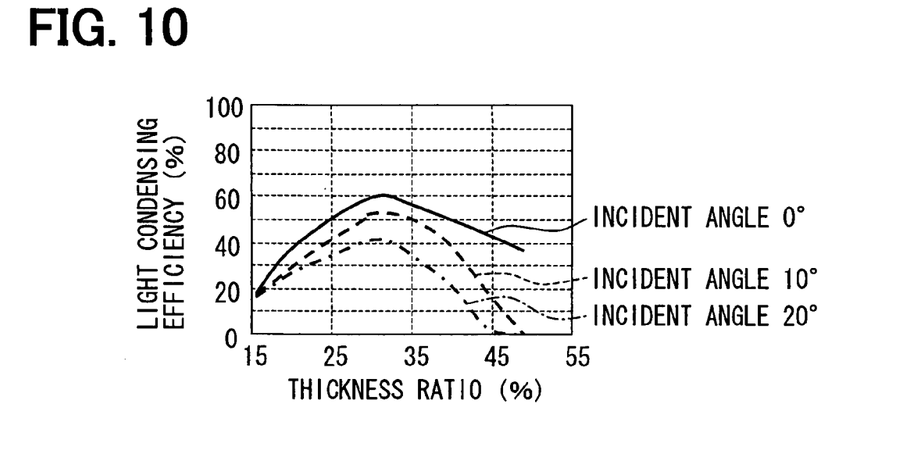
FIG. 10 is a drawing illustrating the relation between the thickness ratio of a refractive body and light condensing efficiency.

The present inventors verified the relation between the following with respect to the radius of curvature at the parabolic peak of the mirror 112: the ratio of the opposition distance L3 between the incidence surface 111a and opposite face 111b of the refractive body 111 along the optical axis (the ratio of thickness of the refractive body 111 against a radius of curvature of mirror surface); and the light condensing efficiency of the optical receiver 100. FIG. 10 illustrates the result of the verification. FIG. 10 is a drawing illustrating the relation between the thickness ratio of the refractive body 111 against a radius of curvature of mirror surface and the light condensing efficiency. When the verification was conducted, the following conditions were used: the radius of curvature of the mirror 112 should be 8 mm; the diameter of the circular incidence surface 111a of the refractive body 111 should be 10 mm; and the size of the light-sensitive element 120 in the direction of the light receiving surface should be 3 mm square. When light is transmitted with its beam diameter reduced (in a state close to parallel light), like light from a laser pointer, a loss of 50% or so occurs from when the light is transmitted to when it is reflected by a reflective object and received. To ensure a light condensing efficiency of 10% in total, ranging from transmission to reception, the following measure was taken with the foregoing taken into account: it was ensured that the light-sensitive element 120 could detect with accuracy a range within which a light condensing efficiency of 20% or higher could be ensured at the optical receiver 100. It was revealed that light in a wide angular range could be efficiently condensed (detected by the light-sensitive element 120 with accuracy) by taking the following measure (the angular range is the range of angle θi of incidence on the incidence surface 111a of the refractive body 111): the optical receiver 100 is so constructed that the ratio of thickness of the refractive body 111 is not less than 0.18 and not more than 0.40, as illustrated in FIG. 10.

The description of this embodiment takes as an example a case where the following measure is taken: the incidence surface 111a of the refractive body 111 is in a circular shape, and the light receiving surface 121 of the light-sensitive element 120 placed on the incidence surface 111a is in a rectangular shape. However, the shape of each member is not limited to that in the example.

Figure 11:
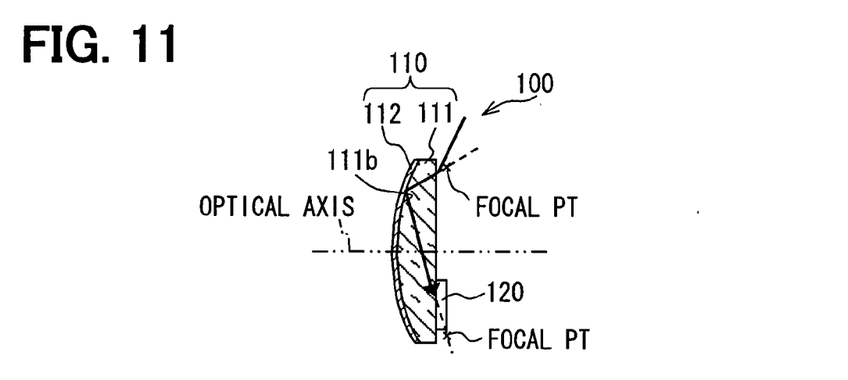
FIG. 11 is a sectional view illustrating a modification to an optical receiver.

The above description of this embodiment takes as an example a case where the light-sensitive element 120 is fixed in a position overlapping the optical axis on the incidence surface 111a. However, the disposed position of the light-sensitive element 120 is not limited to that in the example. The light-sensitive element 120 may be fixed in a position off the optical axis on the incidence surface 111a depending on the use environment. The ellipsoidal mirror 112 can reflect light from either of the two focal points to the other focal point regardless of the incident angle θi. Therefore, the disposed position of the light-sensitive element 120 may be established in the optical path of the reflected light from the mirror 112 to a focal point on the incidence surface of the refractive body 111 as illustrated in FIG. 11. Thus, light in a wide angular range can be efficiently condensed. FIG. 11 is a sectional view illustrating a modification to the optical receiver 100.

The description of this embodiment takes as an example a case where the incidence surface 111a of the refractive body 111 is a flat surface perpendicular to the optical axis. However, the incidence surface 111a may be constructed as a curved surface as illustrated in FIGS. 5A to 5C referred to in relation to the first embodiment. Further, it may be constructed as a Fresnel surface as illustrated in FIG. 6 referred to in relation to the first embodiment.

As illustrated in FIG., this embodiment uses an eccentric ellipsoidal mirror. Instead, an ellipsoidal mirror (ellipsoid in which the mirror surface intersects its major axis) other than eccentric ellipsoidal mirrors may be adopted.

Fourth Embodiment

Figure 12:
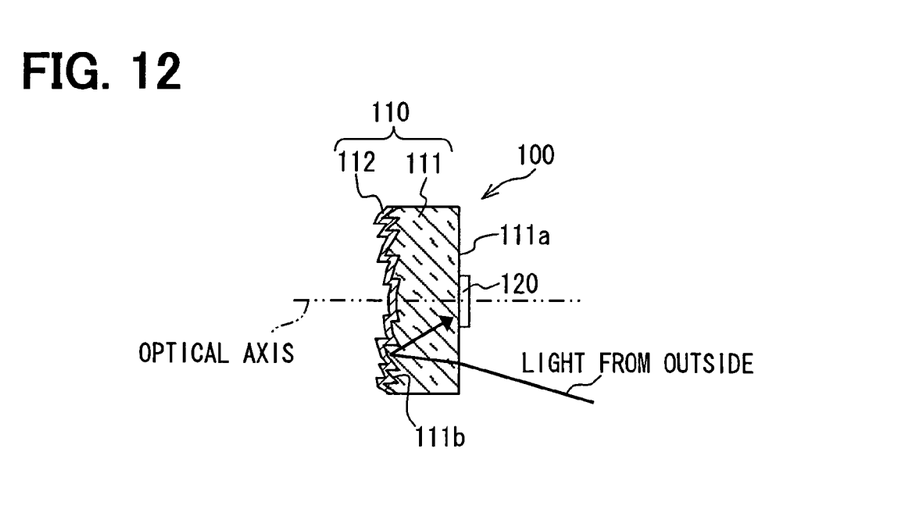
FIG. 12 is a sectional view illustrating the general configuration of an optical receiver in a fourth embodiment.

Description will be given to a fourth embodiment of the invention with reference to FIG. 12. FIG. 12 is a sectional view illustrating the general configuration of an optical receiver 100 in the fourth embodiment of the invention, and it corresponds to FIG. 2B referred to in relation to the first embodiment. In FIG. 12, the adhesive 130 is omitted.

As illustrated in FIG. 12, this embodiment is characterized in that: the opposite face 111b of the refractive body 111 is constructed as a Fresnel surface-corresponding to a curved surface convex on the opposite side to the incidence surface 111a; and the mirror 112 is constructed as a Fresnel mirror 112 in line with the Fresnel surface. The light-sensitive element 120 having the rectangular light receiving surface 121 is fixed in a position overlapping the optical axis on the incidence surface 111a. In this embodiment, the opposite face 111b is constructed as a Fresnel surface in correspondence with the curved surface described in relation to the first embodiment, and the mirror 112 is constructed as a Fresnel mirror 112.

Also, in the optical receiver 100 adopting the Fresnel mirror 112 as mentioned above, the same effect as with the concave mirror 112 described in relation to the first to the third embodiments is expected. In addition, the optical receiver in this embodiment can be more reduced in physical size in the direction along the optical axis than the optical receiver 100 provided with the concave mirror 112 can.

Although the present invention has been fully described in connection with the preferred embodiment thereof with reference to the accompanying drawings, it is to be noted that various changes and modifications will become apparent to those skilled in the art.

Figure 13:
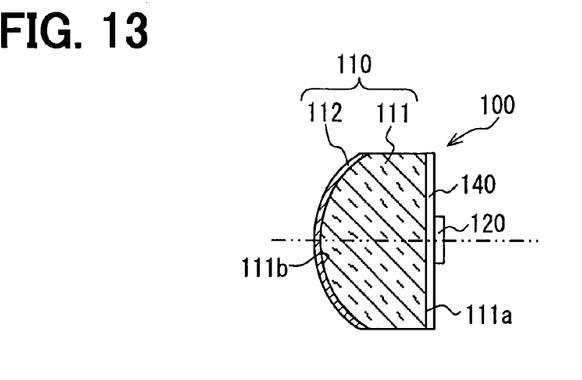
FIG. 13 is a sectional view illustrating another modification to an optical receiver.

For example, the description of these embodiments takes as examples cases where the light-sensitive element 120 is fixed on the incidence surface 111a of the refractive body 111 through the adhesive 130. However, the light-sensitive element 120 only has to be placed at least on the incidence surface 111a. Therefore, the construction illustrated in FIG. 13 may be adopted. That is, an anti-reflection film 140 is provided on the surface of the incidence surface 111a of the refractive body 111, and the light-sensitive element 120 is fixed on the anti-reflection film 140. By providing the anti-reflection film 140 as mentioned above, light reflected at the surface of the refractive body 111 (e.g., the boundary between air and the incidence surface 111a) can be reduced. (That is, light incident on the refractive body 111 can be increased.) In other words, the light condensing efficiency can be enhanced. The construction of the anti-reflection film 140 can be set according to the wavelength of laser light projected from the light sender 20. FIG. 13 is a sectional view illustrating another modification to the optical receiver 100.

Figure 14:
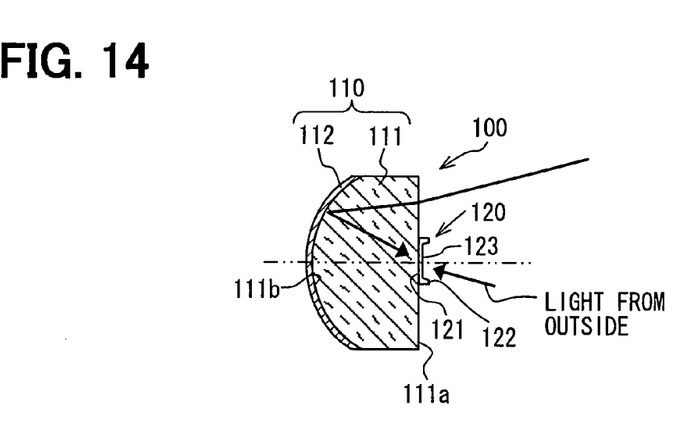
FIG. 14 is a sectional view illustrating another modification to an optical receiver.

The description of these embodiments takes as examples cases where the following is implemented: a photodiode formed in a semiconductor substrate is adopted as the light-sensitive element 120; and the light-sensitive element is placed on the incidence surface 111a of the refractive body 111 with its light receiving surface 121 facing toward the incidence surface 111a. That is, in these examples, light is received only from the light receiving surface 121 side. Instead, the construction illustrated in FIG. 14 may be adopted. In this construction, the light-sensitive element 120 is partly removed from the side of the opposite face 122 to the light receiving surface 121 and the light detecting portion is constructed as a thin portion 123. When the light-sensitive element 120 is constructed in so-called trench structure, as mentioned above, light can also be received from the side of the opposite face 122 to the light receiving surface 121 and the light condensing (light receiving) efficiency can be enhanced. FIG. 14 is a sectional view illustrating another modification to the optical receiver 100.

Figure 15A:
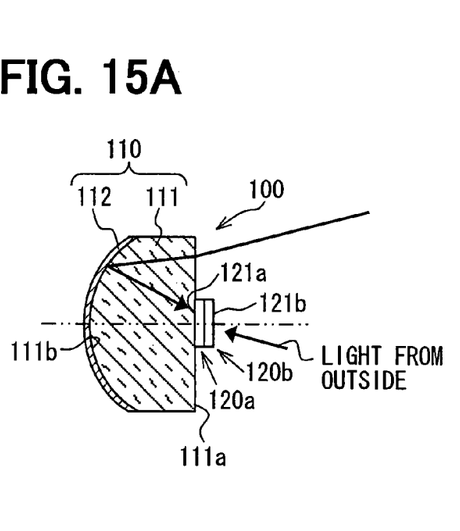
FIGS. 15A and 15B are sectional views illustrating other modifications to an optical receiver.
Figure 15B:
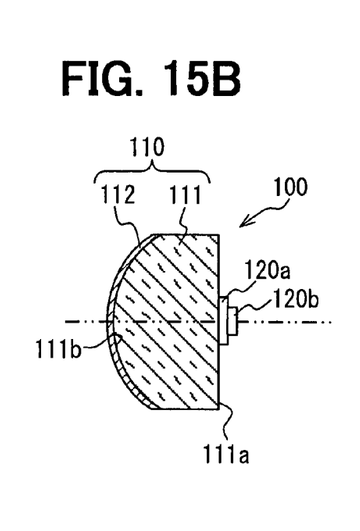

The description of these embodiments takes as examples cases where only one light-sensitive element 120 is placed on the incidence surface 111a of the refractive body 111. Instead, multiple light-sensitive elements 120 may be placed on the incidence surface 111a. In this case, however, a problem arises. When multiple light-sensitive elements 120 are respectively placed in different positions on the incidence surface 111a, external light is blocked by the multiple light-sensitive elements 120. This reduces the effect of the refractive body 111. To cope with this, the construction illustrated in FIG. 15A can be adopted when the optical receiver is so constructed that it has two light-sensitive elements 120a, 120b, for example. That is, a first light-sensitive element 120a is disposed with its light receiving surface 121a facing toward the incidence surface 111a. A second light-sensitive element 120b is disposed in contact with the first light-sensitive element 120a with its light receiving surface 121b facing toward the opposite direction to the incidence surface 111a. (The second light-sensitive element is so disposed that the opposite face to its second light receiving surface 121b is opposed to the opposite face to the light receiving surface 121a of the first light-sensitive element 120a.) When the optical receiver is so constructed that the two light-sensitive elements 120a, 120b are stacked together, as mentioned above, the following advantage is brought: the light condensing (light receiving) efficiency can be enhanced without enlarging an area in which the incidence surface 111a of the refractive body 111 is shielded by the light-sensitive elements 120. The construction illustrated in FIG. 15B may be adopted. That is, the optical receiver may be so constructed that the area of the second light-sensitive element 120b is smaller than the area of the first light-sensitive element 120a in the direction perpendicular to the optical axis. In this case, of the opposite face to the light receiving surface 121a of the first light-sensitive element 120a, the exposed portion can be utilized as a wiring space. FIGS. 15A and 15B are both sectional views illustrating other modifications to the optical receiver 100.

In the above embodiments, the photodiode and the refractive body are in contact with each other. However, the photodiode and the refractive body may be separated from each other as far as the deterioration of the signal is not significant. Preferably, the photodiode and the refractive body are in contact with each other due to an influence for the performance of the apparatus.

Such changes and modifications are to be understood as being within the scope of the present invention as defined by the appended claims.

What is claimed is:

1. A light receiver comprising:
a refractive body that receives an incident light coming in at an incident angle and refracts the incident light with a refractile angle, wherein the refractile angle is smaller than the incident angle;
a first light receiving element that is disposed in a position on an incidence surface of the refractive body, wherein a light receiving face of the first light receiving element faces on the incidence surface of the refractive body; and
a mirror that is disposed on an opposite plane being on an opposite side of the refractive body relative to the incidence surface, wherein the mirror reflects at least a portion of the incident light coming into the refractive body through the incidence surface toward the first light receiving element, wherein
the opposite plane of the refractive body is a curved surface that protrudes toward an opposite direction relative to the incidence surface, and
the mirror is formed in a concave shape that extends along the curved surface.

2. The light receiver as in claim 1, wherein the mirror is a spherical reflector.

3. The light receiver as in claim 2, wherein
a ratio between a distance of the opposite plane from the incidence surface measured along an optical axis and a radius of curvature of the mirror is within a range substantially between 0.25 and 0.40.

4. The light receiver as in claim 2, wherein
the mirror is a parabolic reflector.

5. The light receiver as in claim 4, wherein
a ratio between a distance of the opposite plane from the incidence surface measured along an optical axis and a radius of curvature at an apex of a parabolic surface of the mirror is within a range substantially between 0.30 and 0.45.

6. The light receiver as in claim 1, wherein
the mirror is an elliptical surface reflector.

7. The light receiver as in claim 6, wherein
a ratio between a distance of the opposite plane from the incidence surface measured along an optical axis and a radius of curvature at an apex of an elliptical surface of the mirror is within a range substantially between 0.18 and 0.40.

8. The light receiver as in claim 1, wherein
the refractive body is made of a glass material.

9. The light receiver as in claim 1, wherein
the refractive body is made of a synthetic resin.

10. The light receiver as in claim 1, wherein
the refractive body is made of a semi-conducting material.

11. The light receiver as in claim 1, wherein
the first light receiving element is attached on the incidence surface of the refractive body.

12. The light receiver as in claim 11, wherein
the first light receiving element is attached on the incidence surface of the refractive body with an adhesive that has a same refractive index as the refractive body.

13. The light receiver as in claim 1, wherein
the incidence surface of the refractive body has an antireflection film disposed thereon, and
the first light receiving element is attached on the antireflection film.

14. The light receiver as in claim 1, wherein
the first light receiving element has a thin portion that is formed by removing thickness from an opposite surface of the light receiving face.

15. A radar apparatus comprising:
a light emitting unit that emits a laser light; and
the light receiver that receives a reflected light of the laser light being reflected by a reflective body according to claim 1.

16. A light receiver comprising:
a refractive body that receives an incident light coming in at an incident angle and refracts the incident light with a refractile angle, wherein the refractile angle is smaller than the incident angle;
a first light receiving element that is disposed in a position on an incidence surface of the refractive body, wherein a light receiving face of the first light receiving element faces on the incidence surface of the refractive body; and a mirror that is disposed on an opposite plane being on an opposite side of the refractive body relative to the incidence surface, wherein the mirror reflects at least a portion of the incident light coming into the refractive body through the incidence surface toward the first light receiving element, wherein
the opposite plane of the refractive body is a Fresnel surface that is an equivalent of a convex surface protruding toward an opposite direction relative to the incidence surface, and
the mirror is a Fresnel reflector that extends along the Fresnel surface.

17. The light receiver as in claim 1, wherein
the incidence surface of the refractive body is formed in a shape of a curved surface.

18. The light receiver as in claim 17, wherein
the incidence surface is formed in one of a concave curved shape and a convex curved shape.

19. The light receiver as in claim 17, wherein
the incidence surface includes a concave curved shape portion and a convex curved shape portion.

20. A light receiver comprising:
a refractive body that receives an incident light coming in at an incident angle and refracts the incident light with a refractile angle, wherein the refractile angle is smaller than the incident angle;
a first light receiving element that is disposed in a position on an incidence surface of the refractive body, wherein a light receiving face of the first light receiving element faces on the incidence surface of the refractive body; and
a mirror that is disposed on an opposite plane being on an opposite side of the refractive body relative to the incidence surface, wherein the mirror reflects at least a portion of the incident light coming into the refractive body through the incidence surface toward the first light receiving element, wherein
the incidence surface is in a shape of the Fresnel surface.

21. A light receiver comprising:
a refractive body that receives an incident light coming in at an incident angle and refracts the incident light with a refractile angle, wherein the refractile angle is smaller than the incident angle;
a first light receiving element that is disposed in a position on an incidence surface of the refractive body, wherein a light receiving face of the first light receiving element faces on the incidence surface of the refractive body;
a mirror that is disposed on an opposite plane being on an opposite side of the refractive body relative to the incidence surface, wherein the mirror reflects at least a portion of the incident light coming into the refractive body through the incidence surface toward the first light receiving element, and
a second light receiving element that is apart from the first light receiving element,
wherein the second light receiving element is disposed in contact with the first light receiving element with its reverse face of the light receiving face facing to a reverse face of the light receiving face of the first light receiving element.

22. The light receiver as in claim 21, wherein
an area of the second light receiving element is smaller than an area of the first light receiving element when each of the areas of the light receiving elements are measured as the size of the light receiving face of respective elements.

* * * * *